US012100422B2

(12) United States Patent
Oh et al.

(10) Patent No.: US 12,100,422 B2
(45) Date of Patent: Sep. 24, 2024

(54) MULTIPLE-ACTUATOR HDD ASSEMBLY UTILIZING MULTIPLE-PREAMP ARCHITECTURE WITH SINGLE POINT TERMINATION

(71) Applicant: Western Digital Technologies, Inc., San Jose, CA (US)

(72) Inventors: Daniel Oh, San Jose, CA (US); John T. Contreras, Palo Alto, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/447,440

(22) Filed: Aug. 10, 2023

(65) Prior Publication Data

US 2024/0212713 A1 Jun. 27, 2024

Related U.S. Application Data

(60) Provisional application No. 63/434,446, filed on Dec. 21, 2022.

(51) Int. Cl.
*G11B 5/00* (2006.01)
*G11B 20/02* (2006.01)
*G11B 20/10* (2006.01)

(52) U.S. Cl.
CPC .................................. *G11B 20/02* (2013.01)

(58) Field of Classification Search
CPC ..... G11B 5/00; G11B 27/36; G11B 20/10009; G11B 5/09; G11B 2220/90; G11B 25/043; G11B 5/4826; G11B 5/6005
USPC ......................................................... 360/25
See application file for complete search history.

(56) References Cited

U.S. PATENT DOCUMENTS

| 6,449,115 | B1 | 9/2002 | Maki |
| 8,462,466 | B2 | 6/2013 | Huber |
| 9,165,596 | B1 * | 10/2015 | Contreras ........ G11B 20/10009 |
| 9,666,226 | B1 | 5/2017 | Yamasaki |
| 10,249,339 | B1 | 4/2019 | Mendonsa et al. |

(Continued)

OTHER PUBLICATIONS

San Francisco Circuits, Inc., "Serpentine Routing-Function Over Form in PCB Routing", Retrieved from https://www.sfcircuits.com/pcb-school/serpentine-routing, Known to exist as early as Sep. 8, 2022, p. 7.

(Continued)

*Primary Examiner* — Nabil Z Hindi
(74) *Attorney, Agent, or Firm* — Neugeboren O'Dowd PC

(57) ABSTRACT

Various illustrative aspects are directed to a data storage device comprising a plurality of disks and actuator assemblies, each actuator assembly comprising one or more pre-amplifiers and one or more heads actuated over one of the plurality of disks, wherein each of the one or more heads comprises a read element and a write element. The data storage device further comprises a System on Chip (SoC) comprising one or more processing devices, a first and a second transmission line path between the SoC and a first and a second actuator assembly, respectively, where the first and the second transmission line path intersect at a matched point compensation (MPC), and wherein the one or more processing devices are configured to transmit write data to, or receive read data from, at least one preamplifier of the plurality of actuator assemblies.

17 Claims, 7 Drawing Sheets

(56) References Cited

U.S. PATENT DOCUMENTS 11,355,152 B2    6/2022   Ozeki et al.

OTHER PUBLICATIONS

Gao, et al., "Robust Design of Head Interconnect for Hard Disk Drive", Journal of Applied Physics, May 17, 2005, vol. 97, p. 5.
Coughlin, T.M., Digital Storage in Consumer Electronics, Chapter 2: Fundamentals of Hard Disk Drives, 2018, pp. 25-44.
"Hard Disk Drive SOCs", Retrieved from https://www.broadcom.com/products/storage/hard-disk-drives/socs-read-channel, Known to exist as early as Sep. 8, 2022.

\* cited by examiner

MULTIPLE-ACTUATOR HDD ASSEMBLY UTILIZING MULTIPLE-PREAMP ARCHITECTURE WITH SINGLE POINT TERMINATION

CLAIM OF PRIORITY UNDER 35 U.S.C. § 120

The present Application for Patent claims priority to Provisional Application No. 63/434,446 entitled "MULTIPLE-ACTUATOR HDD ASSEMBLY UTILIZING MULTIPLE-PREAMP ARCHITECTURE WITH SINGLE POINT TERMINATION" filed Dec. 21, 2022, and assigned to the assignee hereof and hereby expressly incorporated by reference herein.

BACKGROUND

Data storage devices such as disk drives comprise one or more disks, and one or more read/write heads connected to distal ends of actuator arms, which are rotated by actuators (e.g., a voice coil motor or VCM, one or more fine actuators) to position the heads radially over surfaces of the disks, at carefully controlled fly heights over the disk surfaces. The disk surfaces each comprise a plurality of radially spaced, concentric tracks for recording user data sectors and servo wedges or servo sectors. The servo tracks are written on previously blank disk drive surfaces as part of the final stage of preparation of the disk drive. The servo sectors comprise head positioning information (e.g., a track address) which is read by the heads and processed by a servo control system to control the actuator arms as they seek from track to track.

FIG. 1 shows a prior art disk format 2 as comprising a number of radially-spaced, concentric servo tracks 4 defined by servo wedges $6_0$-$6_N$ recorded around the circumference of each servo track. A plurality of concentric data tracks are defined relative to the servo tracks 4, wherein the data tracks may have the same or a different radial density (e.g., tracks per inch (TPI)) than the servo tracks 6. Each servo wedge 6, comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo wedge (e.g., servo wedge $6_4$) further comprises groups of phase-based servo bursts 14 (e.g., N and Q servo bursts), which are recorded with a predetermined phase relative to one another and relative to the servo track centerlines.

The coarse head position information is processed to position a head over a target data track during a seek operation, and the servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to the one or more actuators in order to actuate the head radially over the disk in a direction that reduces the PES.

The description provided in the background section should not be assumed to be prior art merely because it is mentioned in or associated with the background section. The background section may include information that describes one or more aspects of the subject technology.

SUMMARY

The following presents a summary relating to one or more aspects and/or embodiments disclosed herein. The following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

HDDs typically include a system-on-a-chip (SoC) that contains many of the electronics and firmware for the HDD. The SoC is connected by a transmission line on a flex cable to the HDD's preamplifier circuits (or preamp IC). The preamp IC is typically located on the actuator assembly that moves the read/write heads to the selected data tracks on the disks. The data to be written by the write head is sent from the SoC to the preamp IC, where the write driver generates analog write current pulses that are applied to the write head to write data by selectively magnetizing the magnetic media of the recording layer on the disk. The data read back from the disk by the read head is transmitted from the preamp IC to the SoC.

The preamp IC includes multiple ports for controlling multiple heads, with each head accessing an associated disk surface. However, the demand for higher storage capacity per HDD requires an increase in the number of disks and heads, and thus an increase in the number of preamp ICs. Additionally, a larger stack-height of disks necessitates the use of multiple actuator assemblies (or actuators) to support higher tracks per inch (TPIs). Prior art HDD designs typically include a dedicated SoC for each actuator assembly, where each actuator assembly includes 1-2 preamps. Generally, aspects of the present disclosure are directed to a data storage device (or HDD) having a multiple actuator-multiple preamp architecture with a single SoC. In some embodiments, the multiple preamps of different actuator assemblies can be controlled using the single SoC, which helps reduce the cost and/or complexity associated with the multiple SoC architecture in the prior art. Additionally, the use of a single SoC alleviates one or more of (1) the need for expensive multi-channel SoCs, and (2) redesign of interconnect components between the SoC and the preamp, such as, but not limited to, flex, connector(s), sealed connector and flex (SCF), and/or printed circuit board (PCB).

Various illustrative aspects are directed to a data storage device comprising a plurality of disks; a plurality of actuator assemblies, each actuator assembly comprising one or more preamplifiers, and one or more heads actuated over one of the plurality of disks; a System on Chip (SoC) comprising one or more processing devices; a first transmission line path between the SoC and a first actuator assembly of the plurality of actuator assemblies; and a second transmission line path between the SoC and a second actuator assembly of the plurality of actuator assemblies. In some implementations of the data storage device, the first transmission line path and the second transmission line path intersect or originate at a first matched point compensation (MPC).

Various illustrative aspects are directed to a method of manufacturing a data storage device, the method comprising providing a plurality of disks, providing a plurality of actuator assemblies, each actuator assembly comprising one or more preamplifiers and one or more heads actuated over one or more of the plurality of disks. In some implementations, the method further comprises providing a System on Chip (SoC) comprising one or more processing devices. In some implementations, the method further comprises coupling the SoC to a first actuator assembly of the plurality of actuator assemblies using a first transmission line path and coupling the SoC to a second actuator assembly of the plurality of actuator assemblies using a second transmission path. In some implementations, each of the first transmission line path and the second transmission line path intersect or originate at a first matched point compensation (MPC).

Various illustrative aspects are directed to a data storage device comprising a plurality of disks; a plurality of actuator assemblies, each actuator assembly comprising one or more preamplifiers, and one or more heads actuated over one of the plurality of disks, wherein each of the one or more heads comprises a read element and a write element; a System on Chip (SoC) comprising one or more processing devices; a first transmission line path between the SoC and a first actuator assembly of the plurality of actuator assemblies; and a second transmission line path between the SoC and a second actuator assembly of the plurality of actuator assemblies. In some implementations of the data storage device, the first transmission line path and the second transmission line path intersect or originate at a first matched point compensation (MPC). In some implementations of the data storage device, the one or more processors are configured to one or more of (1) transmit write data to the one or more preamplifiers of each of the plurality of actuator assemblies, and (2) receive read data from at least one preamplifier of the plurality of actuator assemblies.

Various illustrative aspects are directed to a method of manufacturing a data storage device, the method comprising providing a plurality of disks, providing a plurality of actuator assemblies, each actuator assembly comprising one or more preamplifiers and one or more heads actuated over one or more of the plurality of disks, wherein each of the one or more heads comprises a read element and a write element. In some implementations, the method further comprises providing a System on Chip (SoC) comprising one or more processing devices, wherein the one or more processing devices are configured to one or more of (1) transmit write data to the one or more preamplifiers of each of the plurality of actuator assemblies, and (2) receive read data from at least one preamplifier of the plurality of actuator assemblies. In some implementations, the method further comprises coupling the SoC to a first actuator assembly of the plurality of actuator assemblies using a first transmission line path, and coupling the SoC to a second actuator assembly of the plurality of actuator assemblies using a second transmission path. In some implementations, each of the first transmission line path and the second transmission line path intersect or originate at a first matched point compensation (MPC).

In some implementations of the data storage device and the method described above, the first transmission line path comprises a first trace having a first matched electrical compensation length (MECL), and the second transmission line path comprises a second trace having a second MECL. In some implementations, each of the first MECL and the second MECL is based at least in part on a difference in length between the first and the second transmission line paths.

In some implementations, the data storage device further comprises one or more connectors, including at least a first connector, wherein the first connector is positioned between the SoC and the plurality of actuator assemblies, and wherein the first connector connects each of the first and the second traces to a corresponding actuator assembly.

In some implementations of the data storage device and the method described above, an impedance at the first MPC is based at least in part on an impedance of the first connector.

In some implementations of the data storage device and the method described above, an impedance of the first trace is equal to or substantially equal to an impedance of the second trace.

In some implementations of the data storage device and the method described above, the first and the second transmission line paths are dotted at or near the SoC to minimize or reduce reflections of signals transmitted to or received from the one or more preamplifiers of the plurality of actuator assemblies.

In some implementations of the data storage device and the method described above, each of the first and the second actuator assembly comprises two or more preamplifiers, and the data storage device further comprises a second MPC on a first flex of the first actuator assembly, and a third MPC on a second flex of the second actuator assembly. In some implementations, each of the two or more preamplifiers of the first and the second actuator assembly are connected to a corresponding one of the second MPC or the third MPC using a trace on the respective transmission line path.

In some implementations of the data storage device and the method described above, an impedance at each of the second MPC and the third MPC is greater than an impedance at the SoC, is a non-50-ohm impedance, or a combination thereof. Additionally, or alternatively, an impedance at each of the second MPC and the third MPC is greater than impedance at the SoC, is an impedance that is not equal to an impedance of the first and the second flexes (e.g., non-$Z_3$ impedance in FIG. 4), or a combination thereof.

In some implementations of the data storage device and the method described above, an impedance at the first MPC comprises a non-50-ohm impedance. Additionally, or alternatively, an impedance at the first MPC is different from a respective impedance of each of the first and the second flexes (e.g., non-$Z_3$ impedance in FIG. 4).

In some implementations of the method, the impedance at the first MPC is based at least in part on an impedance of a first connector, where the first connector is positioned between the SoC and the plurality of actuator assemblies, and where the first connector connects each of the first and the second traces to a corresponding actuator assembly.

In some implementations of the method described above, the method further comprises dotting each of the first transmission line path and the second transmission line path at or near the SoC to minimize or reduce reflections of signals transmitted to or received from the one or more preamplifiers of the plurality of actuator assemblies. In some implementations, the first MPC is at or near the SoC.

In some implementations of the method described above, each of the first and the second actuator assemblies comprises two or more preamplifiers, the method further comprising providing a second MPC on a first flex of the actuator assembly, providing a third MPC on a second flex of the actuator assembly, and connecting each of the two or more preamplifiers of the first and the second actuator assembly to a corresponding one of the second MPC or the third MPC using a trace on the respective transmission line path.

Various further aspects are depicted in the accompanying figures and described below and will be further apparent based thereon.

BRIEF DESCRIPTION OF THE DRAWINGS

Various features and advantages of the technology of the present disclosure will be apparent from the following description of particular examples of those technologies, and as illustrated in the accompanying drawings. The drawings are not necessarily to scale; the emphasis instead is placed on illustrating the principles of the technological concepts. In the drawings, like reference characters may refer to the same parts throughout the different views. The drawings depict only illustrative examples of the present disclosure and are not limiting in scope.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The embodiments described below are not intended to limit the invention to the precise form disclosed, nor are they intended to be exhaustive. Rather, the embodiments are presented to provide a description so that others skilled in the art may utilize its teachings. Technology continues to develop, and elements of the described and disclosed embodiments may be replaced by improved and enhanced items, however the teaching of the present disclosure inherently discloses elements used in embodiments incorporating technology available at the time of this disclosure.

HDDs typically include a main integrated circuit, which is typically a system-on-a-chip (SoC) that contains many of the electronics and firmware for the HDD. The SoC is connected by a transmission line on a flex cable to the HDD's read amplifier/write driver integrated circuit (preamp IC). The preamp IC is typically located on the actuator assembly (or actuator) that moves the read/write heads to the selected data tracks on the disks. The data to be written by the write head is sent from the SoC to the preamp IC, where the write driver generates analog write current pulses that are applied to the inductive coil in the write head to write data by selectively magnetizing the magnetic media of the recording layer on the disk. The data read back from the disk by the read head is transmitted from the preamp IC to the SOC.

The preamp IC includes multiple ports for controlling multiple heads, with each head accessing an associated disk surface. However, the demand for higher storage capacity per HDD requires an increase in the number of disks and heads, and thus an increase in the number of preamp ICs. Additionally, a larger stack-height of disks necessitates the use of multiple actuator assemblies (or actuators) to support higher TPIs. Typically, with previous designs, an HDD includes a dedicated SoC for each actuator assembly, where each actuator assembly includes 1-2 preamps. Generally, aspects of the present disclosure are directed to a data storage device (or HDD) having a multiple actuator-multiple preamp architecture with a single SoC. In some embodiments, the multiple preamps of different actuator assemblies can be controlled using the single SoC, which helps reduce the cost and/or complexity associated with the multiple SoC architecture in the prior art. Additionally, the use of a single SoC alleviates one or more of (1) the need for expensive multi-channel SoCs, and (2) redesign of interconnect components between the SoC and the preamp, such as, but not limited to, flex, connector(s), sealed connector and flex (SCF), and/or printed circuit board (PCB).

Figure 1:
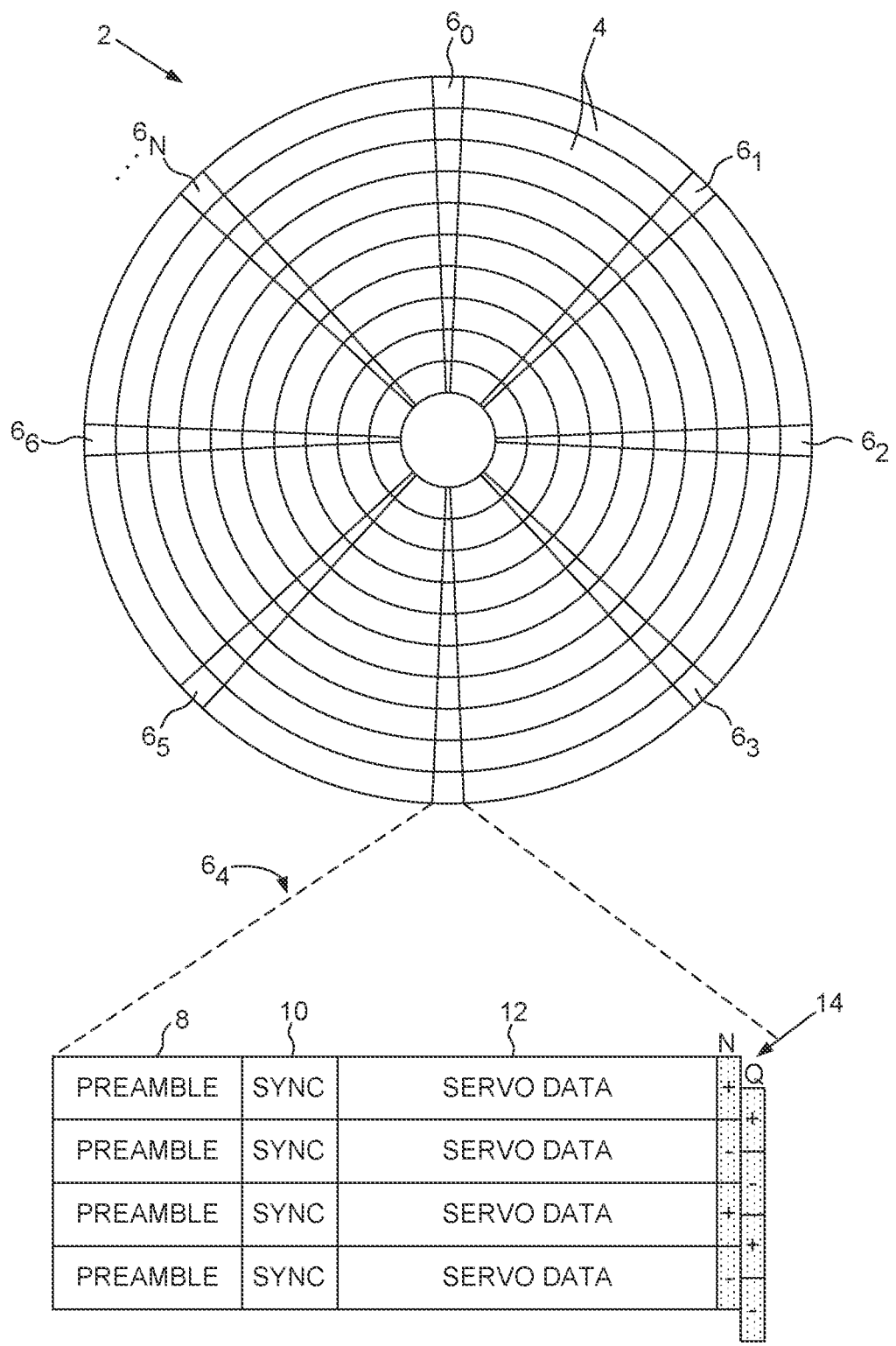
FIG. 1 shows a disk format as comprising a number of radially-spaced, concentric servo tracks defined by servo wedges recorded around the circumference of each servo track, according to various aspects of the present disclosure.
Figure 2A:
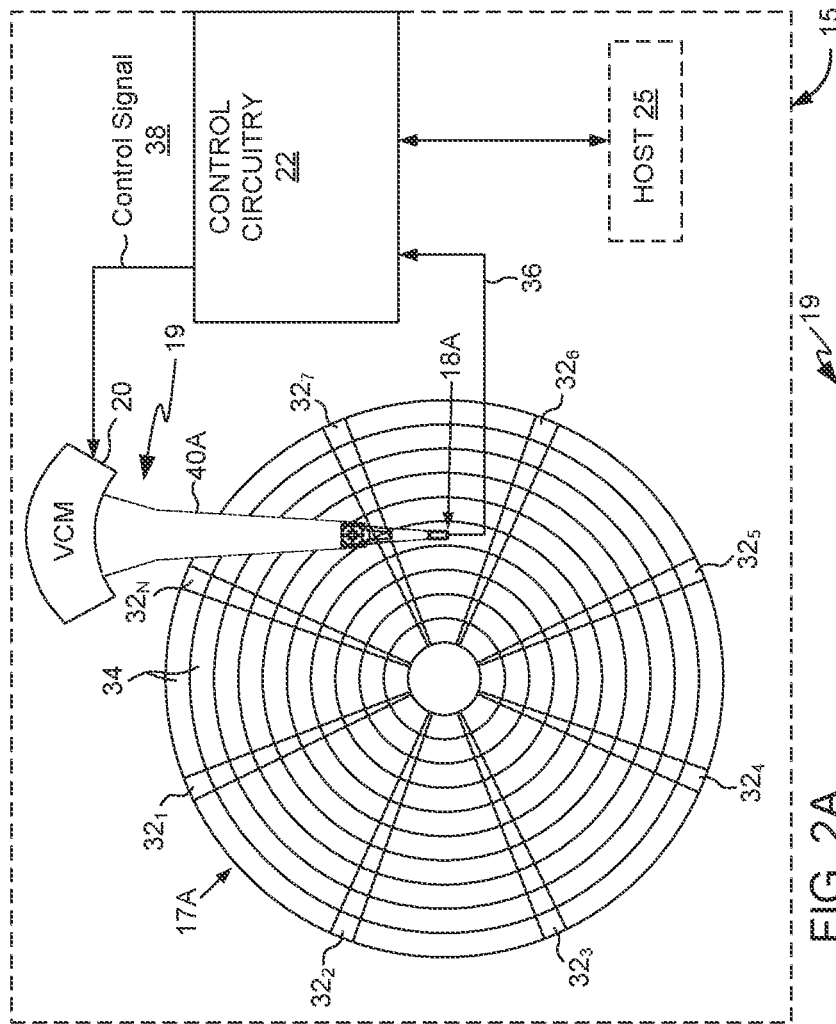
FIGS. 2A and 2B illustrate conceptual block diagrams of a top view and a side view of a data storage device in the form of a disk drive, according to various aspects of the present disclosure.
Figure 2B:
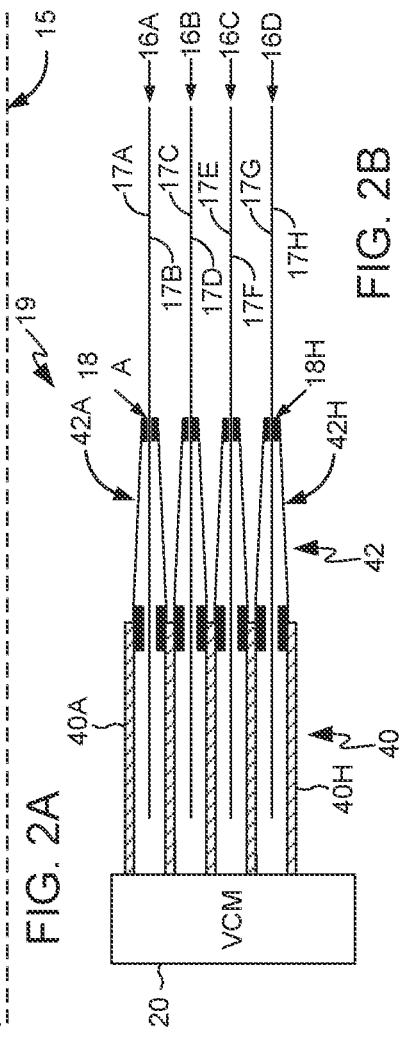
Figure 2C:
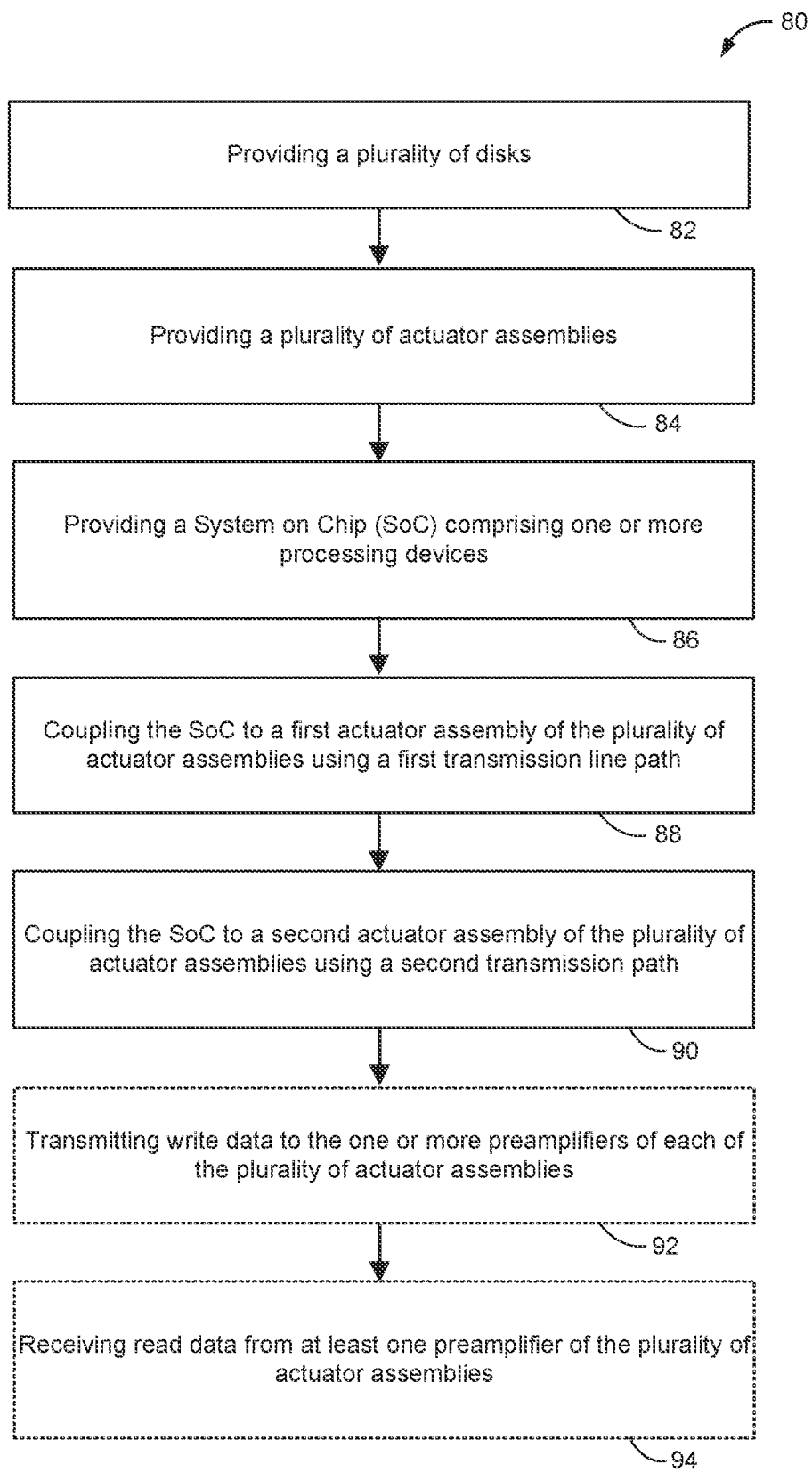
FIG. 2C illustrates a method that a data storage device may perform, execute, and implement, according to various aspects of the present disclosure.

Turning now to FIGS. 2A and 2B, which illustrate conceptual block diagrams of a top view and a side view of a data storage device in the form of a disk drive 15, in accordance with aspects of the present disclosure. Disk drive 15 comprises control circuitry 22, an actuator assembly 19, and a plurality of hard disks 16A, 16B, 16C, 16D ("hard disks 16," "disks 16"). FIG. 2C depicts a flowchart for an example method 80 that control circuitry 22 of disk drive 15 may perform or execute in controlling the operations of disk drive 15, including the operations of heads 18 (e.g., heads 18A-18H) disposed on actuator assembly 19, in accordance with aspects of the present disclosure, as further described below. Actuator assembly 19 thus comprises heads 18 and is configured to position the one or more heads 18 over disk surfaces 17 of the one or more disks 16. Heads 18 may each comprise write and read elements, configured for writing and reading control features and data to and from a corresponding disk surface 17 of hard disks 16.

Actuator assembly 19 comprises a primary actuator 20 (e.g., a voice coil motor ("VCM")) and a number of actuator arms 40 (e.g., topmost actuator arm 40A, as seen in the perspective view of FIGS. 2A and 2B). Each of actuator arms 40 comprises a head 18 at a distal end thereof (e.g., example head 18A comprised in topmost actuator arm 40A, in the view of FIGS. 2A and 2B). Each of actuator arms 40 is configured to suspend one of heads 18 in close proximity over a corresponding disk surface 17 (e.g., head 18A suspended by topmost actuator arm 40A over topmost corresponding disk surface 17A, head 18H suspended by lowest actuator arm 40H over lowest corresponding disk surface 17H). Various examples may include any of a wide variety of other numbers of hard disks and disk surfaces, other numbers of actuator arm assemblies and primary actuators besides the one actuator assembly 19 and the one primary actuator 20 in the example of FIGS. 2A and 2B, and other numbers of fine actuators on each actuator arm, for example.

FIG. 2A also depicts servo sectors 32 (e.g., servo sectors $32_1$ through $32_N$) written onto disk surfaces 17. In some cases, when manufacturing a disk drive, servo sectors 32 may be written to disk surfaces 17 to define a plurality of evenly-spaced, concentric tracks 34. As an example, each servo sector 32 may include a phase lock loop (PLL) field, a servo sync mark (SSM) field, a track identification (TKID) field, a sector ID, and a group of servo bursts (e.g., an alternating pattern of magnetic transitions) that the servo system of the disk drive samples to align the moveable transducer head (e.g., disk head 18) with and relative to, a particular track 34. Each circumferential track 34 includes a plurality of embedded servo sectors 32 utilized in seeking and track following. The plurality of servo sectors 32 are spaced sequentially around the circumference of a circumferential track 34 and extend radially outward from the inner diameter (ID) of disk surface 17. These embedded servo sectors 32 contain servo information utilized in seeking and track following and are interspersed between data regions on disk surfaces 17. Data is conventionally written in the data regions in a plurality of discrete data sectors. Each data region is typically preceded by a servo sector 32. Host 25 may be a computing device such as a desktop computer, a laptop, a server, a mobile computing device (e.g., smartphone, tablet, Netbook, to name a few non-limiting examples), or any other applicable computing device. Alternatively, host 25 may be a test computer that performs calibration and testing functions as part of the disk drive manufacturing processing.

In some examples, the control circuitry 22 is configured to control the actuation of the primary actuator (i.e., VCM). Further, the VCM is configured to actuate the head 18 over the disk surfaces 17. Some aspects of the disclosure are directed to a method of manufacturing and operating a data storage device, as described below in relation to FIG. 2C.

FIG. 2C illustrates an example of a method 80 for manufacturing and operating a data storage device. At step 82, the method 80 comprises providing a plurality of disks. At step 84, the method 80 comprises providing a plurality of actuator assemblies. The actuator assemblies may be similar or substantially to any of the actuators or actuator assemblies described herein, including at least actuator assembly 19. In some embodiments, each actuator assembly comprises one or more preamplifiers (e.g., shown as preamplifiers 341 in FIG. 3B) and one or more heads configured to be actuated over one or more of the plurality of disks. In some cases, each of the one or more heads comprises a read element and a write element that are electronically and/or communicatively coupled to at least one preamplifier. At step 86, the method 80 comprises providing a system on chip (SoC) comprising one or more processing devices (e.g., control circuitry 22). At step 88, the method comprises coupling the SoC to a first actuator assembly of the plurality of actuator assemblies using a first transmission line path. Further, at step 90, the method 80 comprises coupling the SoC to a second actuator assembly of the plurality of actuator assemblies using a second transmission line path. In some cases, the first and the second transmission line path intersect or originate at a common connection point, where the connection point may be located at or near the SoC. In some cases, the connection point where the plurality of transmission line paths originate may be located on a printed circuit board (PCB) on which the SoC is mounted. In this way, the single SoC mounted on the PCB can be used to control a plurality of preamplifiers of different actuator assemblies (i.e., on different actuator paths). In some cases, aspects of the present disclosure are also directed to a method of operating a data storage device. For example, at step 92, the method 80 comprises transmitting write data to the one or more preamplifiers of each of the plurality of actuator assemblies. Additionally, or alternatively, at step 94, the method 80 comprises receiving read data from at least one preamplifier of the plurality of actuator assemblies.

In the embodiment of FIG. 2A, the control circuitry 22 may also process a read signal 36 emanating from the head 18A to demodulate servo data written on the disk (e.g., servo sectors 32) to generate a position error signal (PES) representing an error between the actual position of the head and a target position relative to a target track. The control circuitry 22 may process the PES using a suitable servo control system to generate the control signal 38 (e.g., a VCM control signal) applied to the VCM 20 which rotates an actuator arm 40 about a pivot in order to actuate the head 18 radially over the disk surface 17 in a direction that reduces the PES. In one embodiment, the disk drive may also comprise a suitable microactuator, such as a suitable piezoelectric (PZT) element for actuating the head 18 relative to a suspension, or for actuating a suspension relative to the actuator arm 40.

In one embodiment, the servo data (e.g., servo sectors 32) read from the disk surface 17, i.e., in order to servo the head over the disk during access operations, may be self-written to the disk using the control circuitry 22 internal to the disk drive. In some examples, a plurality of spiral servo tracks are first written to the disk surface 17, and then servo sectors 32 are written to the disk while servoing on the spiral servo tracks. In order to write the spiral servo tracks to the disk surface 17, at least one bootstrap spiral track is first written to the disk without using position feedback from servo data (i.e., the actuator or VCM 20 is controlled open loop with respect to servo data on the disk). Before writing the bootstrap spiral track, feedforward compensation is generated by evaluating the BEMF voltage generated by the VCM 20 during a calibration seek (where the BEMF voltage represents an estimated velocity of the VCM). The bootstrap spiral track is then written to the disk using the feed-forward compensation.

Figure 3A:
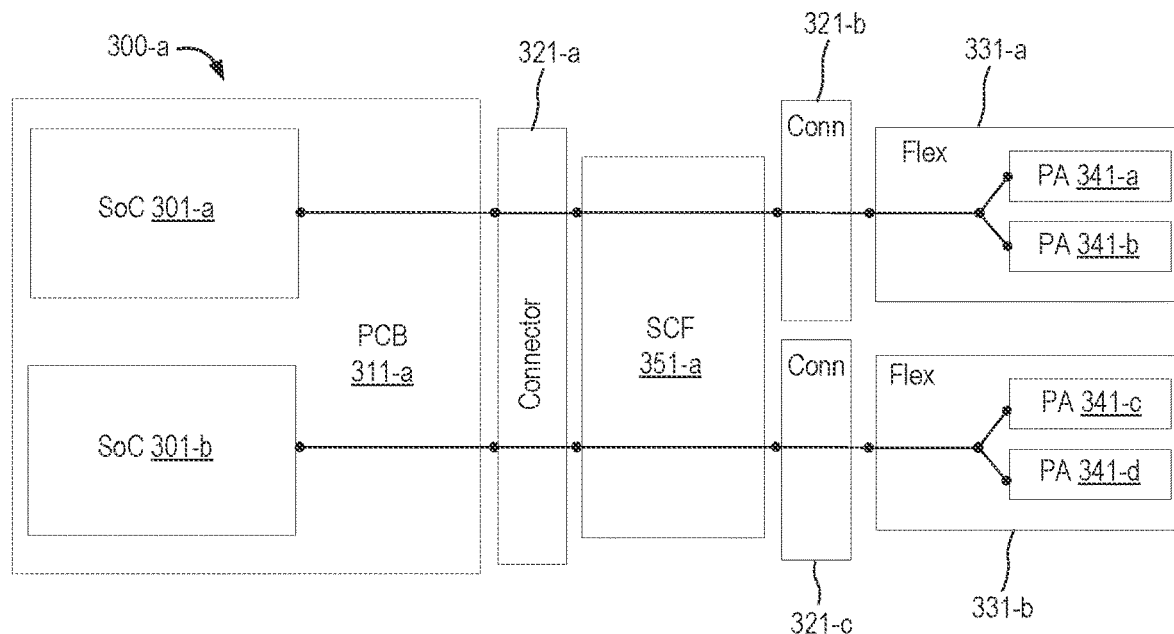
FIG. 3A illustrates a schematic diagram of a data storage device having multiple actuator assemblies and multiple system on chips (SoCs), where each SoC is dedicated to one actuator assembly, as seen in the prior art.

FIG. 3A illustrates a schematic diagram 300-*a* of a data storage device having multiple actuator assemblies and multiple system on chips (SoCs), where each SoC 301 is dedicated to one actuator assembly, as seen in the prior art. As seen, the data storage device comprises a PCB 311-*a*, a SCF 351-*a*, a plurality of flexes 331 (e.g., first flex 331-*a*, second flex 331-*b*), and a plurality of connectors 321 (e.g., first connector 321-*a*, second connector 321-*b*, third connector 321-*c*). Further, the PCB 311-*a* includes a plurality of SoCs 301 (e.g., first SoC 301-*a*, second SoC 301-*b*), where each SoC 301 is connected to one or more preamplifiers of an actuator assembly. For example, a first transmission line path connects the SoC 301-*a* to the preamplifiers 341-*a*, 341-*b* of a first actuator assembly. Additionally, a connection point is provided on the flex 331-*a* for connecting the preamplifiers 341-*a*, 341-*b* to the first transmission line path. Similarly, a second transmission line path connects the SoC 301-*b* to the preamplifiers 341-*c*, 341-*d* of a second actuator assembly. In this case, as well, a connection point is provided on the flex 331-b for connecting the preamplifiers 341-c, 341-d to the second transmission line path.

Aspects of the present disclosure are directed to a multiple-actuator HDD assembly utilizing a multiple-preamplifier architecture with a single-point termination. That is, unlike the architecture seen in FIG. 3A, where a dedicated SoC is provided for each actuator assembly, the present disclosure supports the use of a single SoC for controlling one or more preamplifiers of multiple actuator assemblies. This serves to reduce the cost and/or complexity associated with the use of multiple SoCs, as compared to the prior art. In some cases, the SoC is configured to control at least four (4) preamplifiers of two or more actuator assemblies. Other numbers of preamplifiers may be controlled using the single SoC and the examples listed herein are not intended to be limiting. In certain embodiments, instead of a single SoC, there may be multiple SoCs in the data storage device, with one or more of such SoCs individually associated and coupled with multiple actuator assemblies as described herein.

Figure 3B:
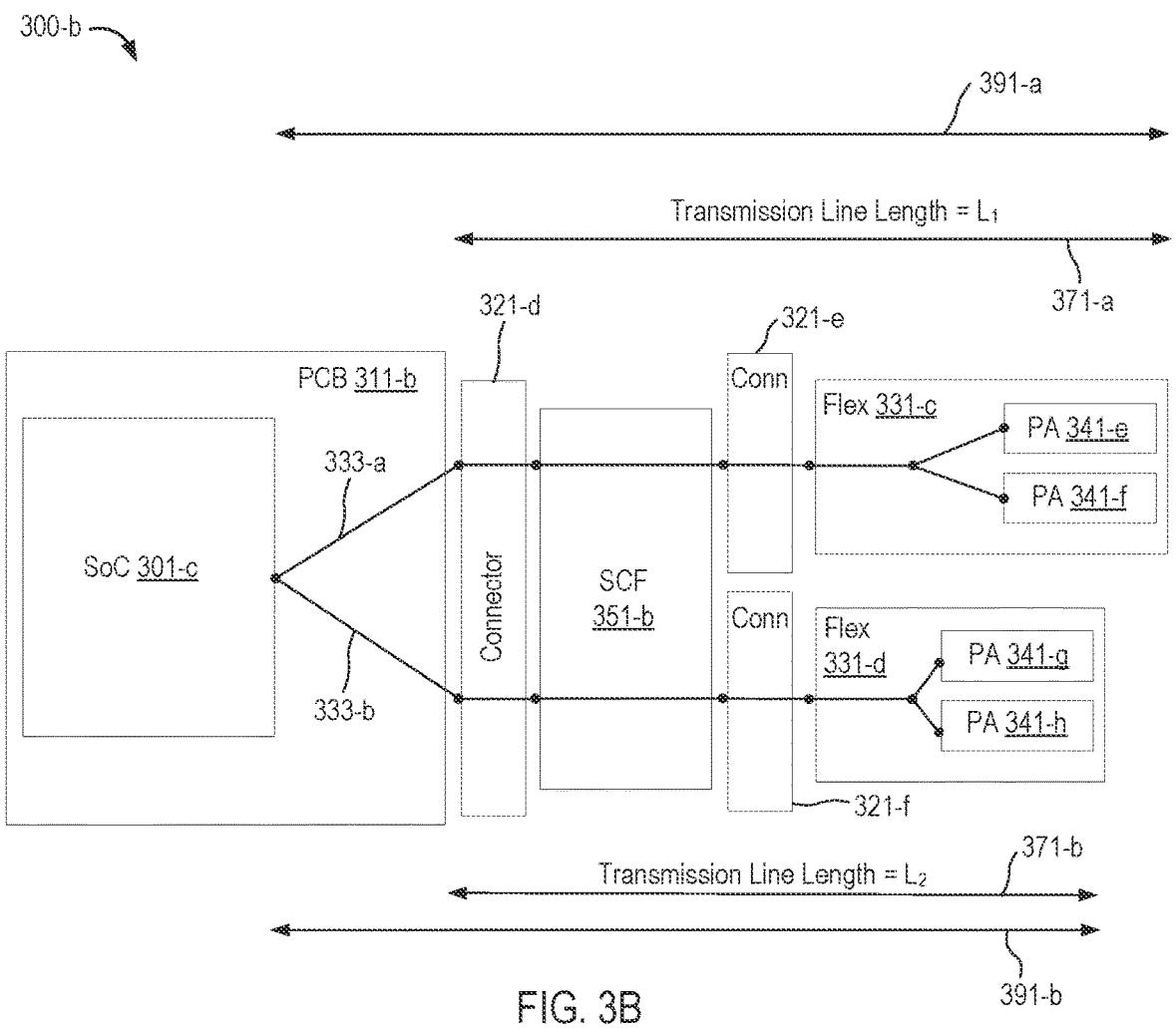
FIG. 3B illustrates a schematic diagram of a data storage device having multiple actuator assemblies controlled using a single SoC, according to various aspects of the present disclosure.

FIG. 3B illustrates a schematic diagram 300-b of a data storage device utilizing a single SoC for controlling one or more preamplifiers of each of a plurality of actuator assemblies, according to various aspects of the disclosure. As seen in FIG. 3B, the data storage device comprises a PCB 311-b having a SoC 301-c, a SCF 351-b, a plurality of flexes 331 (e.g., first flex 331-c, second flex 331-d), and a plurality of connectors 321 (e.g., first connector 321-d, second connector 321-e, third connector 321-f). In this example, a first transmission line path 391-a connects the SoC 301-c to the preamplifiers 341-a, 341-b of a first actuator assembly. In some embodiments, a connection point is provided on the flex 331-c for connecting the preamplifiers 341-a, 341-b to the first transmission line path. Similarly, a second transmission line path 391-b connects the SoC 301-c to the preamplifiers 341-c, 341-d of a second actuator assembly. In this case, as well, a connection point is provided on the flex 331-d for connecting the preamplifiers 341-g, 341-h to the second transmission line path.

In some embodiments, the dotting (or connection point) of the first and second transmission line paths 391-a and 391-b, respectively, occurs on the PCB 311-b. In some circumstances, the two different actuator paths (or transmission line paths) from the SoC to the first and second actuator assemblies may have a different length. For instance, the first actuator path (or transmission line path 391-a) comprises a transmission line 333-a and a transmission line 371-a having a length, $L_1$, extending from the connector 321-d to the first actuator (i.e., comprising the preamps 341-e, 341-f), while the second actuator path (or transmission line path 391-b) comprises a transmission line 371-b and another transmission line having a length, $L_2$, extending from the connector 321-d to the second actuator (i.e., comprising the preamps 341-g, 341-h), where the lengths $L_1$ and $L_2$ are different. It should be noted that, the lengths of the transmission lines 333-a and 333-b on the PCB 311-b may be the same or different. As used herein, the term "matched electrical compensation length" or "MECL" refers to the process of using specific length criteria to help ensure the correct balance between mismatched transmission lengths between different actuator paths is achieved.

Figure 4:
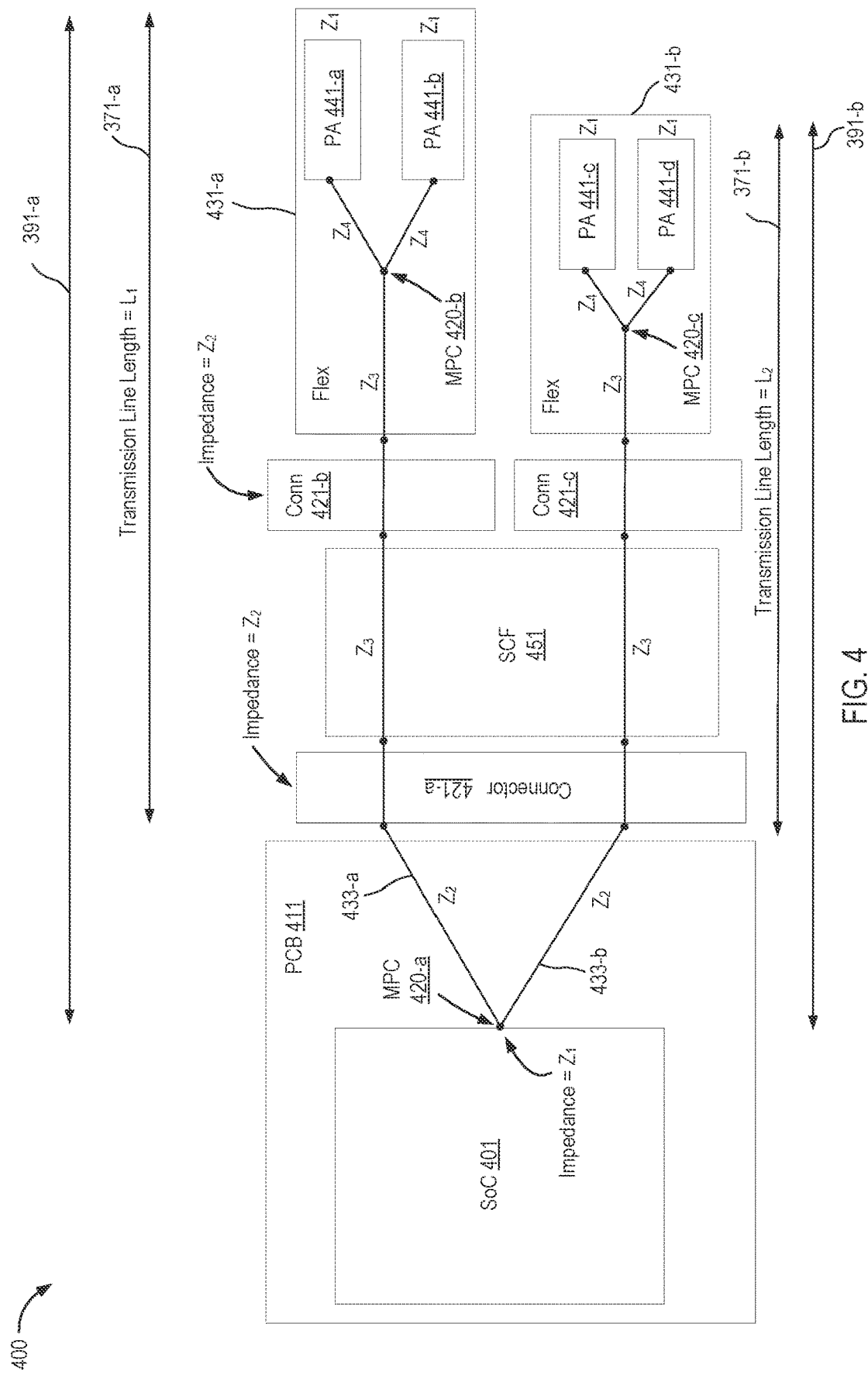
FIG. 4 illustrates a schematic diagram of a data storage device having multiple actuator assemblies and utilizing a multiple preamplifier architecture with single-point termination, according to various aspects of the present disclosure.
Figure 5:
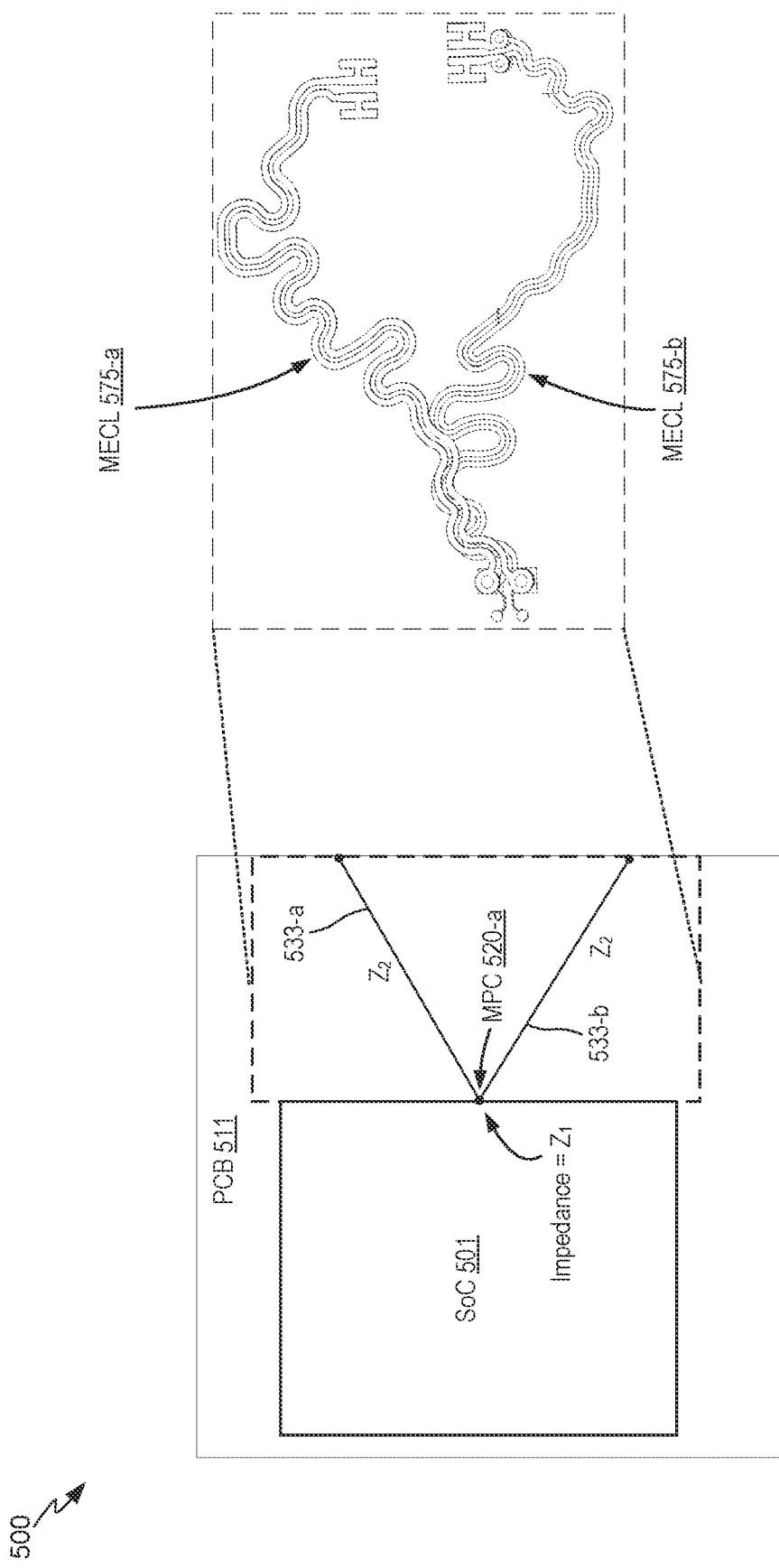
FIG. 5 illustrates a schematic diagram of a data storage device having multiple actuator assemblies controlled using a single SoC on a printed circuit board (PCB), as well as a detailed view of the PCB traces used to connect the SoC to the different actuator assemblies, according to various aspects of the disclosure.

In some cases, the length criteria applied to the portion of the transmission lines (i.e., transmission lines 333-a, 333-b) on the PCB 311-b depends on the difference between the transmission line lengths of the different actuator paths (e.g., first actuator path 391-a comprising the transmission line 371-a of length $L_1$ and second actuator path 391-b comprising the transmission line 371-b of length $L_2$). In some examples, the transmission line(s) 333 on the PCB may be used to compensate for this difference (e.g., $L_1$-$L_2$) in the transmission line lengths 371 of two actuator paths. For example, FIG. 3B depicts two transmission lines 333-a and 333-b on the PCB 311-b, where transmission line 333-a is coupled to the transmission line 371-a of the first actuator path and transmission line 333-b is coupled to the transmission line 371-b of the second actuator path. In some cases, the length of the transmission line 333-a may be at least, or greater than, the length of the transmission line 333-b to compensate for the difference, $L_1$-$L_2$. In some other cases, the transmission lines 333-a and 333-b may have the same or similar length, where the length may be based on one or more of the length of the main transmission line branch (e.g., shown as transmission line branch 644-a in FIG. 6) on the PCB, and the impedances selected during match point compensation (MPC), further described below in relation to FIGS. 4-6. In FIGS. 4 and 5, the length of the main branch (i.e., the distance between the SoC and the MPC 420-a or 520-a) is set to 0. However, in FIG. 6, the main branch length is not set to 0, and is defined by the length of the transmission line branch 644-a (or the distance between the SoC 601 and the MPC 620).

FIG. 4 illustrates a schematic diagram of a data storage device 400 having multiple actuator assemblies and utilizing a multiple preamplifier architecture with single-point termination, according to various aspects of the present disclosure. The data storage device 400 implements one or more aspects of the data storage devices described herein, including at least data storage device 300-b described in relation to FIG. 3B. The data storage device 400 comprises a PCB 411 having a SoC 401 (or processing device(s) 401). Further, the SoC is electrically coupled to a plurality of a preamplifiers of a plurality of actuator assemblies using one or more connectors 421, flexes 431, and a Sealed Connector and Flex (SCF) 451. Specifically, the SoC 401 is connected to the preamp ICs (shown as PA 441-a, 441-b) by flex cables 431-a, 431-b and through its electronic packaging, the PCB 411, flex connectors 421, and SCF 451. Each of the preamplifiers 441 includes one or more ports for controlling one or more heads of the data storage device 400. The SoC 401 includes a data channel with a read path and a write path. In some instances, the read path includes two lines (not shown), +R and −R, and the write path includes two lines (not shown), +W and −W. The read and write paths form a transmission line between the SoC 401 and each of the preamps 441. In some cases, at least a portion of each transmission line is formed on the flex cable (e.g., flex 431-a, flex 431-b). In some embodiments, the SoC (or control circuitry 22) is configured to send write data to one or more of the preamp ICs. For example, the SoC 401 may transmit write data to all the preamps 441 simultaneously, even though only one preamp 441 is active. In other cases, the SoC may only transmit data to the active preamp IC. Additionally, the SoC is configured to receive read data from the active preamp 441, and in some embodiments, multiple active preamps 441.

In some embodiments, the dotting (or connection point) of the multiple transmission line paths 391-a, 391-b occurs on the PCB 411. The SCF 451 and flexes 431-a, 431-b have a characteristic impedance, $Z_3$, where $Z_3$=50 ohms, as an example. In some circumstances, inherent discontinuities in the parasitic capacitances of integrated circuits (ICs) and/or inherent impedance discontinuities from connectors may need to be cancelled out (or compensated for) by choosing specific non-50-ohm (or more generally, a non-$Z_3$ ohm value) impedances on the two (2) separate actuator paths, herein referred to as match-point compensation (MPC). As an example, the impedance may be tuned to maintain a 25-ohm equivalent impedance. Further, the SCF 451 and the flexes 431-*a*, 431-*b* may be routed to have an impedance $Z_3$ (e.g., 50 ohms). In some cases, the connector 421-*a* may be configured to take in a plus-plus-minus-minus signal (++−−) instead of a ground-signal-signal-ground (GSSG) signal, which helps lower the connector impedance from its characteristic impedance of 75 ohms closer to 50 ohms, for instance, to 58 ohms ($Z_2$). In such cases, the impedance of the transmission line segments (e.g., transmission line segments 433-*a*, 433-*b*) on the PCB 411, i.e., extending from the MPC 420-*a* to the connector 421-*a* may be selected to be equal to the connector impedance, $Z_2$, which serves to lower the reflections due to impedance discontinuities on the 2 separate actuator paths. For instance, the impedance, $Z_2$, can be selected to be the connector impedance of 58 ohms. As seen, MPCs 420-*b*, 420-*c* are also provided on each of the flexes 431, i.e., where the preamplifiers 441 connect to the flex. To reduce the reflection from SoC 401 to the preamplifiers 441, the SoC 401 and the preamplifiers are selected to have the same (or substantially the same) impedance, $Z_1$. In one non-limiting example, the impedance, $Z_1$, at the SoC 401 is 100 ohms, which matches the impedance at the preamps 441. In such cases, the characteristic impedance, $Z_4$, of the transmission line segments between the MPCs 420 (e.g., MPCs 420-*b*, 420-*c*) and the preamps 441 may be selected to be greater than $Z_1$ (e.g., 100 ohm) to compensate for the inherent discontinuities found in the parasitic capacitances of the preamp ICs. For example, $Z_4$ may be selected to be 145 ohms (or another impedance greater than $Z_1$, where $Z_1$=100 ohms) to minimize the reflections of the write data signals transmitted from the SoC 401 to the preamps 441.

As described above, differences in lengths between the two or more different actuator paths may require specific transmission line lengths to be used on the PCB. FIG. 5 illustrates a detailed view of a PCB 511 having a SoC 501 and two transmission lines 533-*a*, 533-*b* on the PCB 511 for coupling the SoC 501 to the different actuator paths. As seen, the MPC 520-*a*, which is the dotting (or connection point) where the two transmission lines 533-*a* and 533-*b* split off is provided on the PCB 511. More specifically, the dotting is performed at or near the SoC 501, which helps minimize the length of non-matching impedances (e.g., deviating from 50 ohm), thus reducing reflections in the transmission line paths to the preamps. In some cases, the impedances $Z_2$ and $Z_1$ shown in FIG. 5 may be similar or substantially similar to the impedances $Z_2$ and $Z_1$ described above in relation to FIG. 4. For instance, $Z_1$=100 ohm and $Z_2$=58 ohm, where $Z_2$ is selected based on one or more of the connector impedance (e.g., 58 ohm), the SCF impedance (e.g., 50 ohm), and/or the flex impedance (e.g., 50 ohm). Some aspects of the present disclosure are directed to a method for determining a matched electrical compensation length (MECL) for each transmission line (or trace) connecting to a respective actuator path. In some embodiments, the MECLs 575-*a*, 575-*b* are chosen to achieve minimum trace length at the required impedance, $Z_2$ (e.g., 58 ohms). In some circumstances, and as illustrated in FIG. 3B, the length of the actuator paths connecting to the first and the second actuator assemblies may be different. For instance, in FIG. 3B, the transmission line length, $L_1$, of the transmission line 371-*a* of the first or upper actuator path 391-*a* is longer than the transmission line length, $L_2$, of the transmission line 371-*b* of the second or lower actuator path 391-*b*. As used herein, MECL refers to the process of using specific length criteria to help achieve an adequate balance between mismatched transmission lengths (e.g., length of transmission line 371-*a* is greater than length of transmission line 371-*b*) of different actuator paths (e.g., actuator paths 391-*a*, 391-*b*). In some circumstances, this mismatch of transmission line lengths between actuator paths may inadvertently affect the achievable data rate if it is not accounted for. Some aspects of the present disclosure are directed to determining a MECL for the transmission line traces (e.g., transmission lines 533-*a*, 533-*b*) routed on the PCB 511. In some instances, choosing the correct MECL (e.g., for achieving minimum trace length at the required impedance, $Z_2$) may result in wide "serpentine like" transmission line traces on the PCB 511. FIG. 5 depicts an example of the transmission line traces, shown as MECL 575-*a* and MECL 575-*b*, routed on the PCB 511, with MECL 575-*a* being shorter than MECL 575-*b*. Here, the MECL 575-*a* corresponds to the PCB routing path connected to the longer actuator path (i.e., first/upper actuator path) in FIG. 3B, while the MECL 575-*b* corresponds to the PCB routing path connected to the shorter actuator path (i.e., second/lower actuator path) in FIG. 3B. Specifically, MECL 575-*a* corresponds to the PCB routing path connected to the longer transmission line 371-*a*, and MECL 575-*b* corresponds to the PCB routing path connected to the shorter transmission line 371-*b*.

In this way, the MPC and MECL transmission line strategies described above allow equivalent or higher data rates to be achieved (i.e., as compared to the prior art dual actuator dual SoC configuration) for an HDD assembly utilizing a single SoC to multiple actuator and multiple preamp architecture. In some instances, a data rate of at least 4.25 Gbps may be achieved by the disclosed data storage device.

While generally described in relation to the write path, it should be noted that similar or substantially design principles can be applied to the read path (i.e., the signal path for the reader of the recording head 18A) to achieve multiple-actuator and preamplifier control from a single SoC. In some circumstances, writer bandwidth requirements are higher than reader bandwidth requirements, which means that the reader may be able to tolerate larger impedance discontinuities. In some examples, the lower bandwidth requirements for read allows a higher degree of tolerance for I/O constraints on the connector(s) 321. Thus, minor MPC changes (e.g., 58 ohm for write, 75 ohm for read) can be provided between the read and write systems to achieve multiple-actuator and multiple preamp control from a single SoC. Similar to the write path, the dotting (or connection point of the two transmission line paths) can occur on the PCB (e.g., PCB 311-*b* in FIG. 3B). In some cases, the impedance at the connectors 321 (e.g., connector 321-*d*, connector 321-*e*, and/or connector 321-*f*) may be at 75 ohms and/or the connectors 321 may utilize a ground-signal-signal-ground (GSSG) configuration. In such cases, the MPC or dotting at the PCB 311-*b* may be at the same impedance (e.g., 75 ohms) as the connectors 321 to accommodate the GSSG pin configuration.

Thus, aspects of the present disclosure are directed to a method, apparatus, and control circuitry for achieving multi-actuator control from a single point of termination using existing HDD components, as well as novel impedance tuning and/or PCB routing techniques. In some embodiments, the single point control architecture at the SoC may be employed for both the writer and reader subsystems of the HDD. Equivalent or higher data rates (as compared to the prior art dual actuator dual SoC configuration) may be achieved through one or more of the matched point compensation (MPC) and matched electrical compensation length (MECL). The present disclosure can help support the growing demand for higher stack-heights using a single SoC, where the single SoC is configured to control a plurality of preamps (e.g., >2 preamps, >4 preamps, etc.) on different actuator paths. Additionally, or alternatively, the multi-actuator HDD assembly utilizing a multi-preamp architecture can help optimize track misregistration (TMR) and/or tracks per inch (TPI) performance as compared to the prior art. In some aspects, the use of a single point termination at the SoC for controlling multiple preamps can also help reduce the overall cost of the HDD system, since it avoids the need for a dedicated SoC for each actuator assembly.

Figure 6:
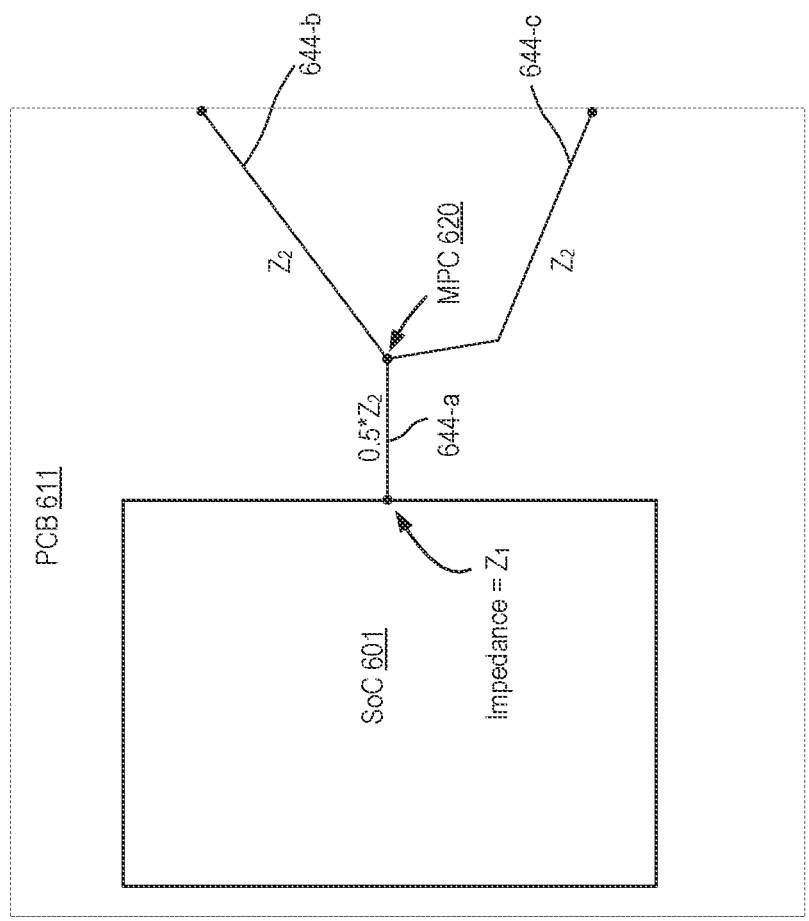
FIG. 6 illustrates an example of a PCB comprising a SoC and traces having a different matched electrical compensation length (MECL), where each trace connects the SoC to a different actuator assembly, according to various aspects of the disclosure.

FIG. 6 illustrates a schematic diagram 600 of a PCB 611 comprising a SoC 601 and a plurality of transmission line traces routed on the PCB 611, according to various aspects of the disclosure. In this example, the dotting (or connection point) of the transmission line PCB segment traces 644-$b$ and 644-$c$ connected to the first and second actuator paths, respectively, is not at the SoC 601. Instead, a transmission line trace 644-$a$ is provided between the SoC and the dotting or connection point (shown as MPC 620), and the transmission line traces 644-$b$ and 644-$c$ are then split off from said connection point. The characteristic impedance, $Z_2$, of the transmission line traces 644-$b$ and 644-$c$ that split off from the dotting or connection point may be similar or substantially similar to the characteristic impedance, $Z_2$, in the preceding figures where the dotting occurs at the SoC. In other words, the PCB 601 shown in FIG. 6 comprises the same match point compensation (e.g., MPC 620) as the MPC 520 of PCB 511 in FIG. 5. For instance, the impedance, $Z_2$, identified by MPC 620 and MPC 520 may be at or around 58 ohms. However, the MECL in FIG. 6 may be different from the MECL in FIG. 5. In this example, the transmission line trace 644-$b$ comprises the section connecting to the longer transmission line path or actuator path, while the trace 644-$c$ comprises the section connecting to the shorter transmission line path or actuator path. To achieve the target bandwidth or data rate (e.g., 4.25 Gbps), the length of trace 644-$c$ may be longer than the length of trace 644-$b$. In some cases, the difference in trace length between the shorter and longer traces may be based in part on the length of the trace 644-$a$ between the SoC and the dotting or connection point. In accordance with aspects of the disclosure, the dotting may be provided at the SoC 601, in which case the length of the trace 644-$a$ is roughly equal to zero and the MECL of the traces 644-$b$ and 644-$c$ have the same or similar value.

Any suitable control circuitry (e.g., control circuitry 22 in FIG. 2A) may be employed to implement the flow diagrams in the above examples, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one example, the read channel and data storage controller are implemented as separate integrated circuits, and in another example, they are fabricated into a single integrated circuit or system on a chip (SoC), such as SoCs 301-$c$, 401, and/or 501 in FIGS. 3, 4, and/or 5, respectively. In addition, the control circuitry 22 may include a preamp circuit implemented as a separate integrated circuit, integrated into the read channel or data storage controller circuit, or integrated into an SoC.

In some examples, the control circuitry, such as, but not limited to, control circuitry 22, comprises a microprocessor executing instructions, the instructions being operable to cause the microprocessor to perform the flow diagrams (e.g., shown in FIG. 2C) described herein. The instructions may be stored in any computer-readable medium. In some examples, they may be stored on a non-volatile semiconductor memory device, component, or system external to the microprocessor, or integrated with the microprocessor in an SoC (e.g., SoC 401 in FIG. 4). In some examples, the instructions are stored on the disk and read into a volatile semiconductor memory when the disk drive is powered on. In some examples, the control circuitry comprises suitable logic circuitry, such as state machine circuitry. In some examples, at least some of the flow diagram blocks may be implemented using analog circuitry (e.g., analog comparators, timers, etc.), and in other examples at least some of the blocks may be implemented using digital circuitry or a combination of analog and digital circuitry.

In various examples, one or more processing devices may comprise or constitute the control circuitry 22 as described herein, and/or may perform one or more of the functions of control circuitry as described herein. In various examples, the control circuitry 22, or other one or more processing devices performing one or more of the functions of control circuitry as described herein, may be abstracted away from being physically proximate to the disks and disk surfaces. The control circuitry, or other one or more processing devices performing one or more of the functions of control circuitry as described herein, may be part of or proximate to a rack of or a unitary product comprising multiple data storage devices, or may be part of or proximate to one or more physical or virtual servers, or may be part of or proximate to one or more local area networks or one or more storage area networks, or may be part of or proximate to a data center, or may be hosted in one or more cloud services, in various examples.

In various examples, a disk drive, such as disk drive 15, may include a magnetic disk drive, an optical disk drive, a hybrid disk drive, or other types of disk drive. In addition, some examples may include electronic devices such as computing devices, data server devices, media content storage devices, or other devices, components, or systems that may comprise the storage media and/or control circuitry as described above.

The various features and processes described above may be used independently of one another or may be combined in various ways. All possible combinations and subcombinations are intended to fall within the scope of this disclosure. In addition, certain methods, events or process blocks may be omitted in some implementations. The methods and processes described herein are also not limited to any particular sequence, and the blocks or states relating thereto can be performed in other sequences. For example, described tasks or events may be performed in an order other than that specifically disclosed, or multiple tasks and/or events may be combined in a single block or state. The example tasks or events may be performed in serial, in parallel, or in another manner. Tasks or events may be added to or removed from the disclosed examples. The example systems and components described herein may be configured differently than described. For example, elements may be added to, removed from, or rearranged compared to the disclosed examples.

While certain example embodiments are described herein, these embodiments are presented by way of example only, and do not limit the scope of the inventions disclosed herein.

Thus, nothing in the foregoing description implies that any particular feature, characteristic, step, module, or block is necessary or indispensable. The novel methods and systems described herein may be embodied in a variety of other forms. Various omissions, substitutions and changes in the form of the methods and systems described herein may be made without departing from the spirit and scope of the present disclosure.

Method 80 and other methods of this disclosure may include other steps or variations in various other embodiments. Some or all of any of method 80 may be performed by or embodied in hardware, and/or performed or executed by a controller, a CPU, a field-programmable gate array (FPGA), a SoC, a multi-processor system on chip (MPSoC), which may include both a CPU and an FPGA, and other elements together in one integrated SoC, or other processing device or computing device processing executable instructions, in controlling other associated hardware, devices, systems, or products in executing, implementing, or embodying various subject matter of the method.

Data storage systems, devices, and methods are thus shown and described herein, in various foundational aspects and in various selected illustrative applications, architectures, techniques, and methods for a multiple-actuator HDD assembly utilizing multiple-preamp architecture with single point termination for data storage, and other aspects of this disclosure. Persons skilled in the relevant fields of art will be well-equipped by this disclosure with an understanding and an informed reduction to practice of a wide panoply of further applications, architectures, techniques, and methods for a multiple-actuator HDD assembly utilizing multiple-preamp architecture with single point termination for data storage, and other aspects of this disclosure encompassed by the present disclosure and by the claims set forth below.

As used herein, the recitation of "at least one of A, B and C" is intended to mean "either A, B, C or any combination of A, B and C." The descriptions of the disclosed examples are provided to enable any person skilled in the relevant fields of art to understand how to make or use the subject matter of the present disclosure. Various modifications to these embodiments will be readily apparent to those skilled in the art based on the present disclosure, and the generic principles defined herein may be applied to other examples without departing from the spirit or scope of the disclosure. Thus, the present disclosure is not limited to the embodiments shown herein but is to be accorded the widest scope consistent with the principles and novel features disclosed herein.

The present disclosure and many of its attendant advantages will be understood by the foregoing description, and various changes may be made in the form, construction, and arrangement of the components without departing from the disclosed subject matter or without sacrificing all of its material advantages. The form described is merely explanatory, and the following claims encompass and include a wide range of embodiments, including a wide range of examples encompassing any such changes in the form, construction, and arrangement of the components as described herein.

While the present disclosure has been described with reference to various examples, it will be understood that these examples are illustrative and that the scope of the disclosure is not limited to them. All subject matter described herein are presented in the form of illustrative, non-limiting examples, and not as exclusive implementations, whether or not they are explicitly called out as examples as described. Many variations, modifications, and additions are possible within the scope of the examples of the disclosure. More generally, examples in accordance with the present disclosure have been described in the context of particular implementations. Functionality may be separated or combined in blocks differently in various examples of the disclosure or described with different terminology, without departing from the spirit and scope of the present disclosure and the following claims. These and other variations, modifications, additions, and improvements may fall within the scope of the disclosure as defined in the claims that follow.

What is claimed is:

1. A data storage device comprising:
   a plurality of disks;
   a plurality of actuator assemblies, each actuator assembly comprising:
      one or more preamplifiers; and
      one or more heads actuated over one of the plurality of disks;
   a System on Chip (SoC) comprising one or more processing devices;
   a first transmission line path between the SoC and a first actuator assembly of the plurality of actuator assemblies; and
   a second transmission line path between the SoC and a second actuator assembly of the plurality of actuator assemblies; and
   wherein the first transmission line path and the second transmission line path intersect or originate at a first matched point compensation (MPC).

2. The data storage device of claim 1, wherein:
   the first transmission line path comprises a first trace having a first matched electrical compensation length (MECL); and
   the second transmission line path comprises a second trace having a second MECL; and
   wherein each of the first MECL and the second MECL is based at least in part on a difference in length between the first and the second transmission line paths.

3. The data storage device of claim 2, wherein an impedance of the first trace is equal to or substantially equal to an impedance of the second trace.

4. The data storage device of claim 2, further comprising:
   one or more connectors, including at least a first connector, wherein the first connector is positioned between the SoC and the plurality of actuator assemblies, and wherein the first connector connects each of the first and the second traces to a corresponding actuator assembly.

5. The data storage device of claim 4, wherein an impedance at the first MPC is based at least in part on an impedance of the first connector.

6. The data storage device of claim 1, wherein the first and the second transmission line paths are dotted at or near the SoC to reduce reflections of signals transmitted to or received from the one or more preamplifiers of the plurality of actuator assemblies.

7. The data storage device of claim 1, wherein each of the first and the second actuator assembly comprises two or more preamplifiers, the data storage device further comprising:
   a second MPC on a first flex of the first actuator assembly; and
   a third MPC on a second flex of the second actuator assembly;
   and wherein each of the two or more preamplifiers of the first and the second actuator assemblies are connected to a corresponding one of the second MPC or the third MPC using a trace on the respective transmission line path.

8. The data storage device of claim 7, wherein an impedance at each of the second MPC and the third MPC is greater than an impedance at the SoC, is an impedance that is not equal to an impedance of the first and the second flexes, or a combination thereof.

9. The data storage device of claim 1, wherein an impedance at the first MPC is different from a respective impedance of each of the first and the second flexes.

10. A method of manufacturing a data storage device, comprising:
providing a plurality of disks;
providing a plurality of actuator assemblies, each actuator assembly comprising:
one or more preamplifiers; and
one or more heads actuated over one or more of the plurality of disks;
providing a System on Chip (SoC) comprising one or more processing devices;
coupling the SoC to a first actuator assembly of the plurality of actuator assemblies using a first transmission line path; and
coupling the SoC to a second actuator assembly of the plurality of actuator assemblies using a second transmission path; and
wherein the first transmission line path and the second transmission line path intersect or originate at a first matched point compensation (MPC).

11. The method of claim 10, wherein:
the first transmission line path comprises a first trace having a first matched electrical compensation length (MECL); and
the second transmission line path comprises a second trace having a second MECL;
and wherein each of the first MECL and the second MECL is based at least in part on a difference in length between the first and the second transmission line paths.

12. The method of claim 11, wherein an impedance of the first trace is equal to or substantially equal to an impedance of the second trace.

13. The method of claim 11, wherein an impedance at the first MPC is based at least in part on an impedance of a first connector, wherein the first connector is positioned between the SoC and the plurality of actuator assemblies, and wherein the first connector connects each of the first and the second traces to a corresponding actuator assembly.

14. The method of claim 10, further comprising:
dotting each of the first transmission line path and the second transmission line path at or near the SoC to minimize or reduce reflections of signals transmitted to or received from the one or more preamplifiers of the plurality of actuator assemblies, and wherein the first MPC is at or near the SoC.

15. The method of claim 10, wherein each of the first and the second actuator assemblies comprises two or more preamplifiers, the method further comprising:
providing a second MPC on a first flex of the first actuator assembly;
providing a third MPC on a second flex of the second actuator assembly; and
connecting each of the two or more preamplifiers of the first and the second actuator assembly to a corresponding one of the second MPC or the third MPC using a trace on the respective transmission line path.

16. The method of claim 15, wherein an impedance at each of the second MPC and the third MPC is greater than an impedance at the SoC, is an impedance that is not equal to an impedance of the first and the second flexes, or a combination thereof.

17. The method of claim 10, wherein an impedance at the first MPC is different from a respective impedance of each of the first and the second flexes.

* * * * *